United States Patent
Meneghini et al.

(10) Patent No.: US 7,317,849 B1
(45) Date of Patent: Jan. 8, 2008

(54) OPTICAL FIBER SENSOR AND METHOD

(75) Inventors: Chiara Meneghini, Sainte-Foy (CA); Sylvain Thériault, L'ancienne-Lorette (CA); Patrick Paradis, Québec (CA)

(73) Assignee: Institut National D'Optique, Sainte-Foy (CA)

( * ) Notice: Subject to any disclaimer, the term of this patent is extended or adjusted under 35 U.S.C. 154(b) by 0 days.

(21) Appl. No.: 11/422,895

(22) Filed: Jun. 8, 2006

(51) Int. Cl.
*G02B 6/00* (2006.01)
*G02B 6/34* (2006.01)

(52) U.S. Cl. .......................... 385/13; 385/12; 385/37; 385/126

(58) Field of Classification Search ...................... None
See application file for complete search history.

(56) References Cited

U.S. PATENT DOCUMENTS

| | | | | |
|---|---|---|---|---|
| 6,826,343 B2 * | 11/2004 | Davis et al. | ................ | 385/126 |
| 7,027,699 B2 * | 4/2006 | Tao et al. | ................... | 385/126 |
| 2004/0042726 A1 * | 3/2004 | Kersey et al. | ................ | 385/37 |
| 2004/0234218 A1 | 11/2004 | Tao et al. | | |
| 2007/0065077 A1 | 3/2007 | Childers et al. | | |

OTHER PUBLICATIONS

Flockhart, G.M.H.; MacPherson, W.N.; Barton, J.S.; Jones, J.D.C.; Zhang, L.; Bennion, I.; "Two-axis bend measurement with Bragg gratings in multicore optical fiber," Optical Society of America, 2003.

* cited by examiner

*Primary Examiner*—Tina M Wong
(74) *Attorney, Agent, or Firm*—Ogilvy Renault LLP

(57) ABSTRACT

An optical fiber sensor for detecting curvature of a body/structure comprises a cladding having an outer periphery. A central core receives and transmits light. The central core has Bragg gratings and is positioned in neutral planes of the cladding. Peripheral cores receive and transmit light. The peripheral cores have Bragg gratings and are peripherally positioned in the cladding with respect to the neutral planes. A connection configuration is provided in the outer periphery of the cladding to attach the optical fiber sensor to a body/structure such that the central core and the peripheral cores are in a predetermined orientation with respect to the body/structure to measure curvature of the body/structure.

12 Claims, 7 Drawing Sheets

OPTICAL FIBER SENSOR AND METHOD

BACKGROUND OF THE INVENTION

1. Field of the Invention

The present invention relates to optical fibers and, more particularly, to optical fiber sensors to measure deformation.

2. Background Art

Optical fiber systems offering sensing functions have been used in numerous applications. One known sensor technology for optical fibers is the Bragg grating sensor. The Bragg grating is a periodic variation of the refractive index along the fiber axis and it is photoimprinted in the core of the fiber by using UV light. The main property of a Bragg grating is that part of the light going along the fiber is reflected back by the grating. This process is wavelength selective and the wavelength with the highest reflectivity is called the Bragg wavelength (typically located at the center of the spectral response). Any temperature variation or strain applied to the optical fiber might result in a Bragg wavelength shift and/or spectral deformation, depending on how perturbations are applied to the fiber.

United States patent application Publication No. US 2004/0234218, by inventors Tao et al. discloses an optical fiber device that is applied for the measurement of multiple parameters, such as deformation. More specifically, the optical fiber device described in Publication No. US 2004/0234218 has at least two cores within a cladding, with the two cores respectively provided with Bragg grating sensors. The optical fiber of the Tao et al. reference describes a fiber configuration in which four cores, each with different characteristics, are provided (FIG. 1 of US 2004/0234218), with a central core, and three peripheral cores, at an equal radial distance from the central core and 120 degrees apart. Such an optical fiber is suitable for decoupling the effect of bending from the effect of temperature on the Bragg gratings of the fiber. However, an orientation of the fiber must be considered in such decoupling, but this publication provides no detail as to how the fiber may be oriented in a desired manner. Moreover, it is noted that in embodiments each fiber core in this publication has different characteristics (optical, thermal and mechanical) due to different chemical compositions.

SUMMARY OF INVENTION

It is therefore an aim of the present invention to provide an optical fiber sensor that addresses issues associated with the prior art.

It is a further aim of the present invention to provide novel optical fiber sensor and optical fiber sensor system.

Therefore, in accordance with the present invention, an optical fiber sensor for detecting curvature of a body/structure is described, comprising: a cladding having an outer periphery; a central core for receiving and transmitting light, the central core having Bragg gratings and being positioned in a first neutral plane of the cladding, such that the Bragg gratings of the central core are insensitive to bending about a first axis associated with the first neutral plane and sensitive to temperature variations; at least one peripheral core for receiving and transmitting light, the at least one peripheral core having Bragg gratings and being peripherally positioned in the cladding with respect to the first neutral plane such that the Bragg gratings of the at least one peripheral core are sensitive to bending about the first axis and to temperature variations; and a connection configuration in the outer periphery of the cladding to attach the optical fiber sensor to a body/structure such that the central core and the at least one peripheral core are in a predetermined position and orientation with respect to the body/structure, so as to measure curvature of the body/structure about at least the first axis independently of the effect of temperature variations by associating the Bragg wavelengths of the central core and of the at least one peripheral core.

Further in accordance with the present invention, there is provided a method for measuring curvature in a body, comprising the steps of: providing an optical fiber sensor having at least two cores in a cladding, a plurality of longitudinal sets of Bragg gratings being provided in the cores at known locations along the optical fiber sensor, each Bragg grating having a different Bragg wavelength; positioning the optical fiber sensor on a body in a known position and orientation; emitting light in the optical fiber sensor; receiving light from the optical fiber sensor; measuring the Bragg wavelength shifts from the light received from the optical fiber sensor; and calculating the curvature of the body by associating the measured Bragg wavelength shifts at the known locations in the cores to the curvature of the optical fiber sensor with respect to the known position and orientation.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
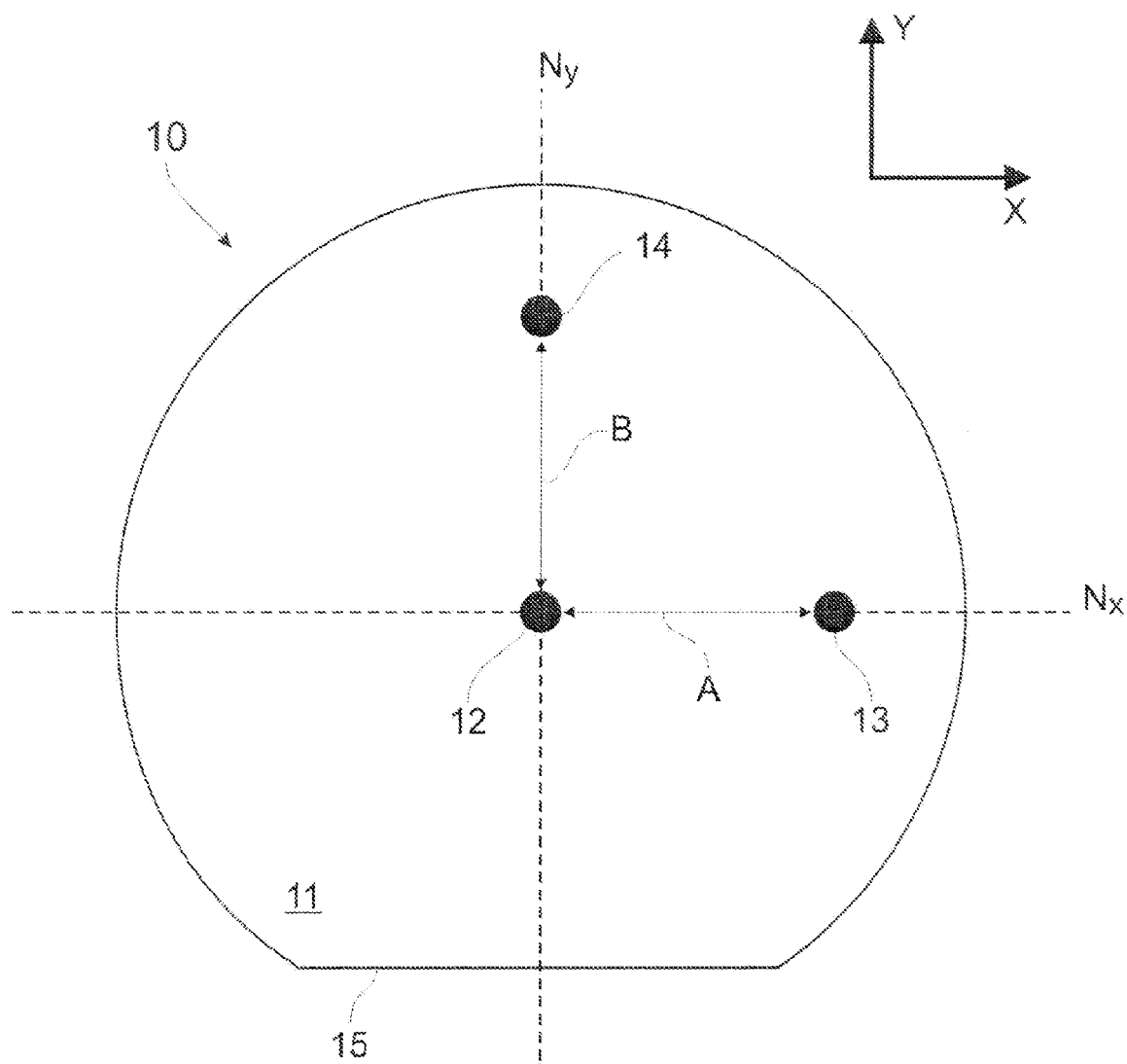
FIG. 1 is an end elevation view of an optical fiber sensor in accordance with a first embodiment of the present invention.

Referring now to the drawings and, more particularly, to FIG. 1, an optical fiber sensor in accordance with a first embodiment is generally shown at 10. The optical fiber sensor 10 is an optical fiber having a cladding 11, a central core 12, and peripheral cores 13 and 14.

The cladding 11 has a generally circular section, but has a flat edge, defining a flat surface 15 on the full length of the cladding 11. The cladding 11 is made of a material having an effective index of refraction smaller than that of the cores 12, 13 and 14.

The central core 12 is generally centrally positioned within the cladding 11, as is visible in FIG. 1.

The peripheral cores 13 and 14 are respectively spaced apart from the central core 12 by distances A and B. In the first embodiment of FIGS. 1 and 2, the central core 12 and the peripheral core 13 lie in a first neutral plane $N_x$ generally parallel to the flat surface 15. The central core 12 and the peripheral core 14 lie in a second neutral plane $N_y$ generally perpendicular to the flat surface 15. The central core 12 is therefore at the intersection of the first and second neutral planes.

Figure 2:
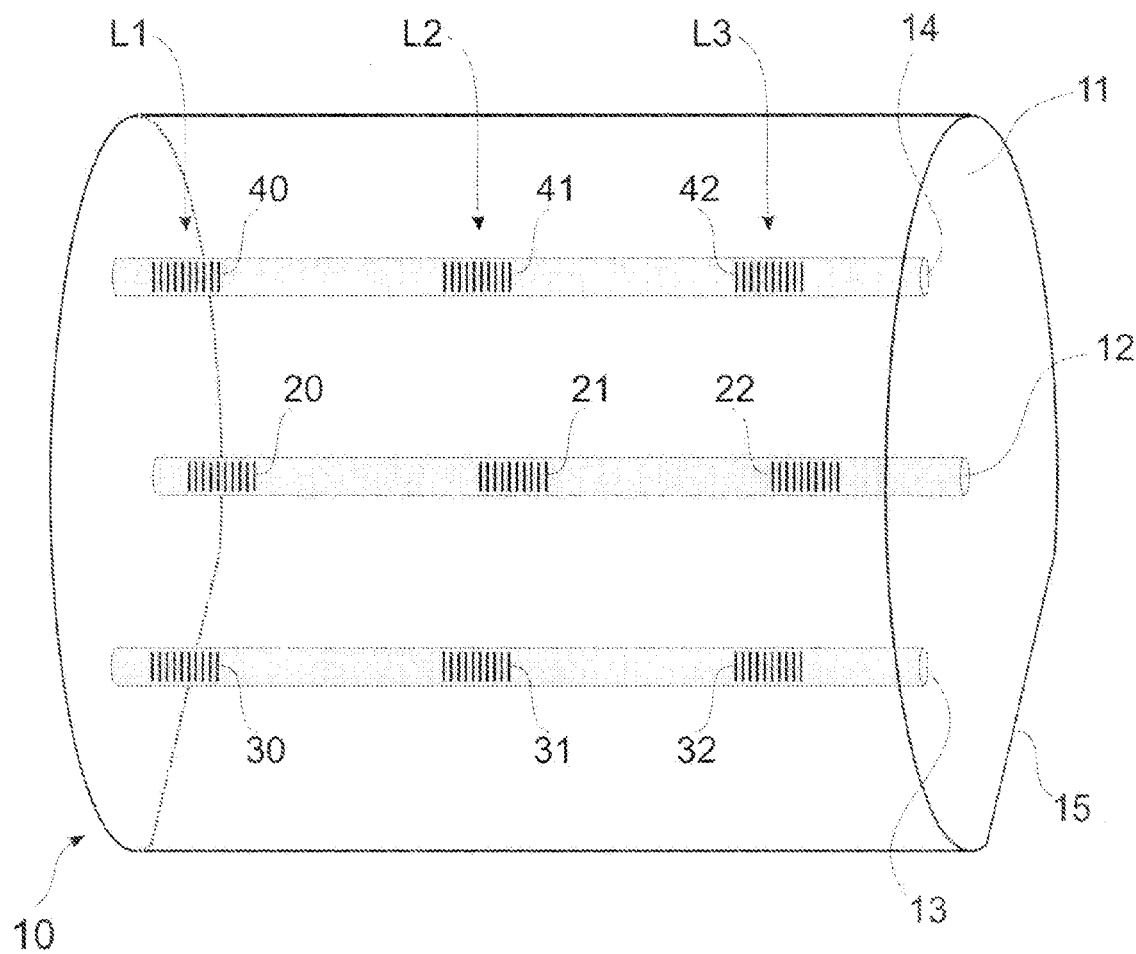
FIG. 2 is a perspective schematic line-wire view of the optical fiber sensor of FIG. 1.

Referring to FIG. 2, the optical fiber sensor 10 is shown having sets of Bragg gratings in the cores 12, 13 and 14. More specifically, the central core 12 has gratings 20, 21, 22, etc. The peripheral core 13 has gratings 30, 31, 32, etc. The peripheral core 14 has gratings 40, 41, 42, etc. For illustrative purposes, only a portion of the optical fiber sensor 10 is illustrated, as the optical fiber sensor 10 typically has a plurality of other Bragg gratings.

The gratings are regrouped by sets of longitudinally aligned gratings, namely a first set of gratings 20, 30 and 40 at location L1 along the fiber, a second set of gratings 21, 31, and 41, at a location L2 along the fiber, etc. Each set of gratings represents a point of detection in a known location along the optical fiber sensor 10.

The optical fiber sensor 10 is provided with the flat surface 15 so as to be installed in a predetermined way (i.e., known position and orientation) on a body whose curvature must be detected. The optical fiber sensor 10 is typically associated with a support that will be secured to the body, and the predetermined way by which the optical fiber sensor 10 will be secured to the body through the support will enable to reference the two axes of curvature (illustrated as axis X and axis Y in FIG. 1) about which curvature can be measured.

Moreover, in the first embodiment, the optical fiber sensor 10 is secured to the support in such a way that the optical fiber sensor 10 is prevented from being elongated or stretched.

Figure 3:
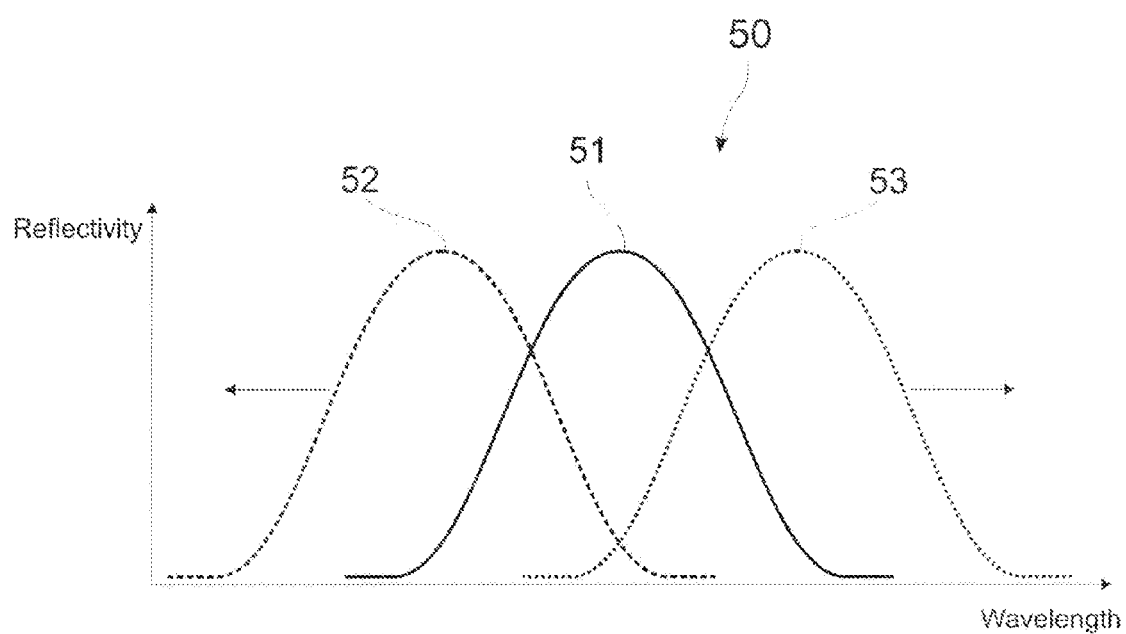
FIG. 3 is a graph illustrating a Bragg spectral response reacting to strains on a reflectivity scale.

Bragg gratings are generally sensitive to elongation or compression that might result from bending or strain and from temperature variations. Referring to FIG. 3, a graph 50 illustrates the reflectivity spectrum of the Bragg grating as a function of the wavelength of light reflected by the Bragg grating, although a similar graph would have been obtained by capturing the light transmitted by the Bragg grating. From an initial position 51, a compression (for instance, resulting from a temperature decrease) of the Bragg grating results in a decrease of the Bragg wavelength, as illustrated as position 52. On the other hand, an elongation (for instance, from a temperature increase) of the Bragg grating results in an increase of the Bragg wavelength, as illustrated at position 53.

The central core 12 is neutrally positioned within the optical fiber sensor 10 and its support so as not to be sensitive to bending. More specifically, the central core 12 lies in the first neutral plane $N_x$, so as to not be sensitive to bending about the X-axis. Similarly, the central core 12 lies in the second neutral plane $N_y$, so as not to be sensitive to bending about the Y-axis. In the preferred embodiment, the peripheral core 13 lies in the first neutral plane $N_x$, and is therefore not sensitive to bending about the X-axis (sensitive only to bending about the Y-axis), whereas the peripheral core 14 lies in the second neutral plane $N_y$, so as not to be sensitive to bending about the Y-axis (sensitive only to bending about the X-axis).

The optical fiber cross-section temperature at a specific location should be almost uniform. This implies that all gratings at a known location will have the same temperature, such that the gratings in all cores will have the same Bragg wavelength shift at that known location. Accordingly, the combination of the central core 12 with the peripheral cores 13 and 14 enables to separate bending-induced wavelength shifts from temperature-induced wavelength shifts in the Bragg gratings. Hence, the optical fiber sensor 10 enables to measure the curvature of a body independently of the effect of temperature on the optical fiber sensor 10.

Figure 4:
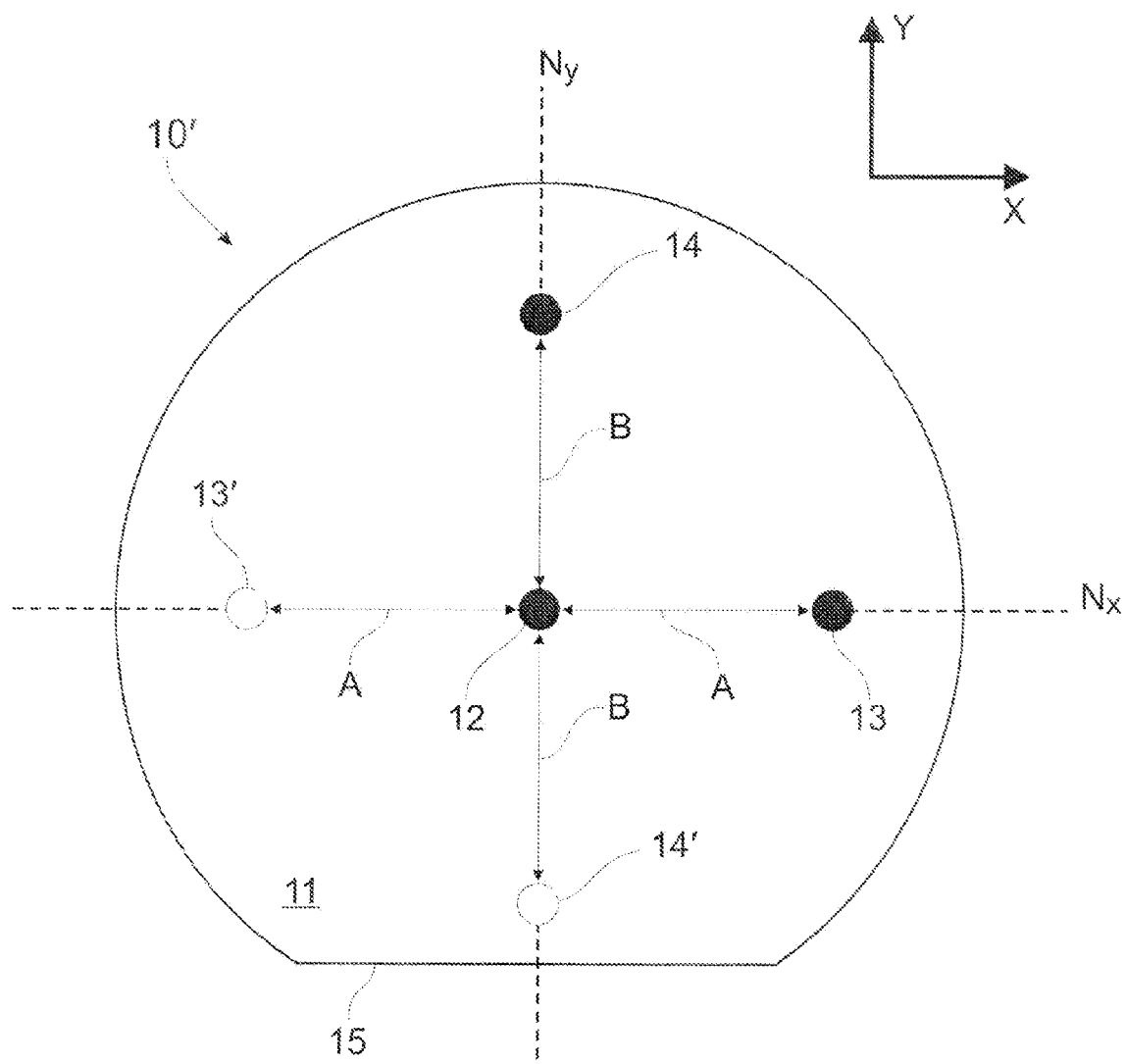
FIG. 4 is an end elevation view of an optical fiber sensor in accordance with a second embodiment of the present invention.

Referring to FIG. 4, an optical fiber sensor in accordance with a second embodiment is generally shown at 10'. The optical fiber sensor 10' is generally similar to the optical fiber sensor 10 (FIG. 1), in that it has a cladding 11, a central core 12, and peripheral cores 13 and 14. The optical fiber sensor 10' additionally has peripheral cores 13' and 14', diametrically opposed to the peripheral cores 13 and 14, respectively.

The peripheral cores 13' and 14' are provided to increase the sensitivity of the optical fiber sensor 10'. More specifically, the longitudinally aligned sets of gratings of the peripheral cores 13' and 14' are respectively combined with that of the peripheral cores 13 and 14, to provide two gratings per axis of curvature (e.g., axes X and Y of FIG. 1). For example, when the grating in the peripheral core 13 is compressed, the corresponding grating in the peripheral core 13' is elongated, giving twice the total spectral shift, in opposite directions, of this Bragg gratings set compared to the central core and the peripheral core 13 Bragg gratings set.

Figure 5A:
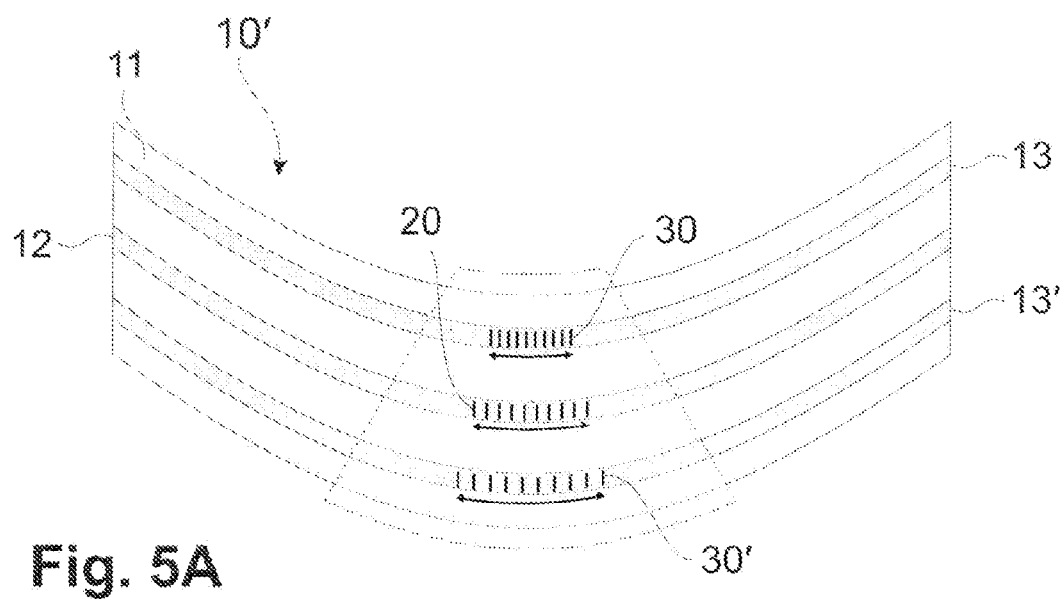
FIG. 5A is a schematic view illustrating the optical fiber sensor of FIG. 4 being bent in a first direction about one axis.
Figure 5B:
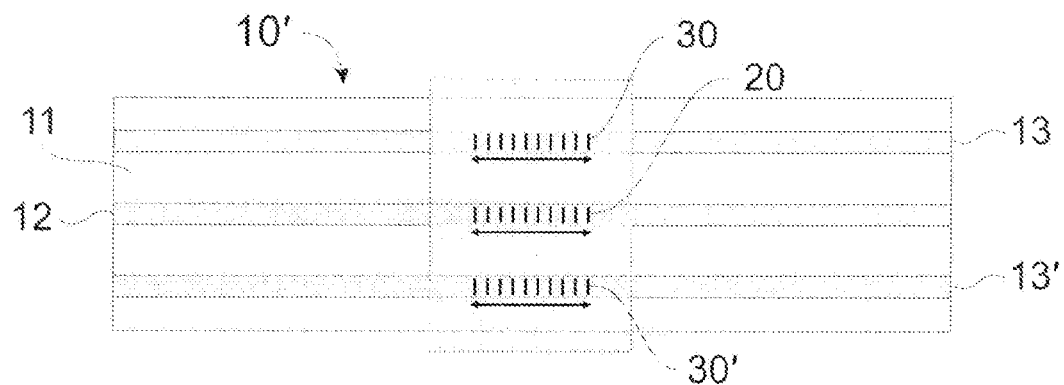
FIG. 5B is a schematic view illustrating the optical fiber sensor of FIG. 4 without being bent.
Figure 5C:
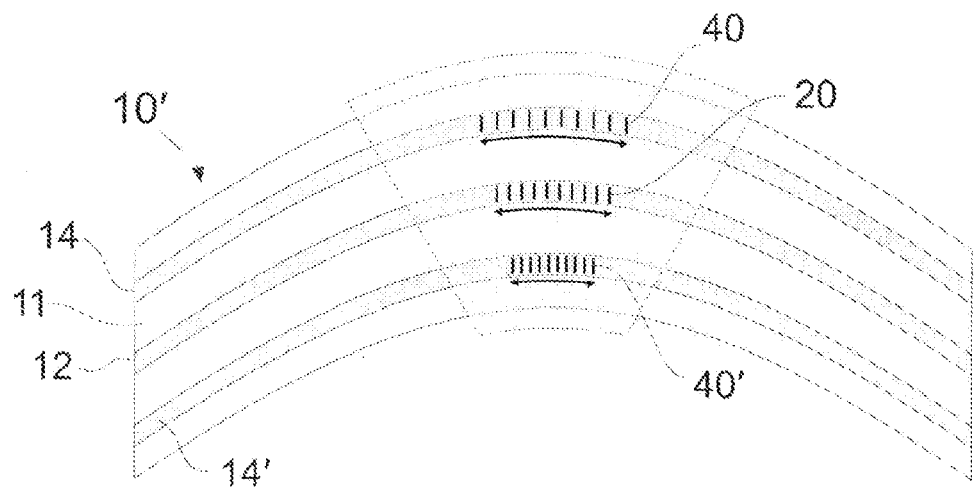
FIG. 5C is a schematic view illustrating the optical fiber sensor of FIG. 4 being bent in a second direction about the axis.

Referring to FIGS. 5A to 5C, the optical fiber sensor 10' is shown as being bent in a first direction about a first axis in FIG. 5A, and in a second direction about the first axis in FIG. 5C, while the optical fiber sensor 10' in FIG. 5B is not bent. It is therefore seen in FIG. 5A that the gratings 30 and 30' (respectively of the peripheral cores 13 and 13') undergo compressive and tensile strains, respectively, whereas in FIG. 5C the gratings 40 and 40' (respectively of the peripheral cores 14 and 14') undergo tensile and compressive strains, respectively, while the centrally-positioned grating 20 generally remains unstrained.

In fact, due to the central position of the core 12, the grating 20 and any other grating in the central core 12 only undergo strains (within the operative curvature range of the sensors 10 and 10') caused by temperature. As all gratings of a same set are generally subjected to the same temperature, the strain induced by bending can be isolated from the strain induced by temperature by relating the gratings of the central core 12 to the gratings of the peripheral cores 13, 13', 14 and/or 14'.

Figure 6:
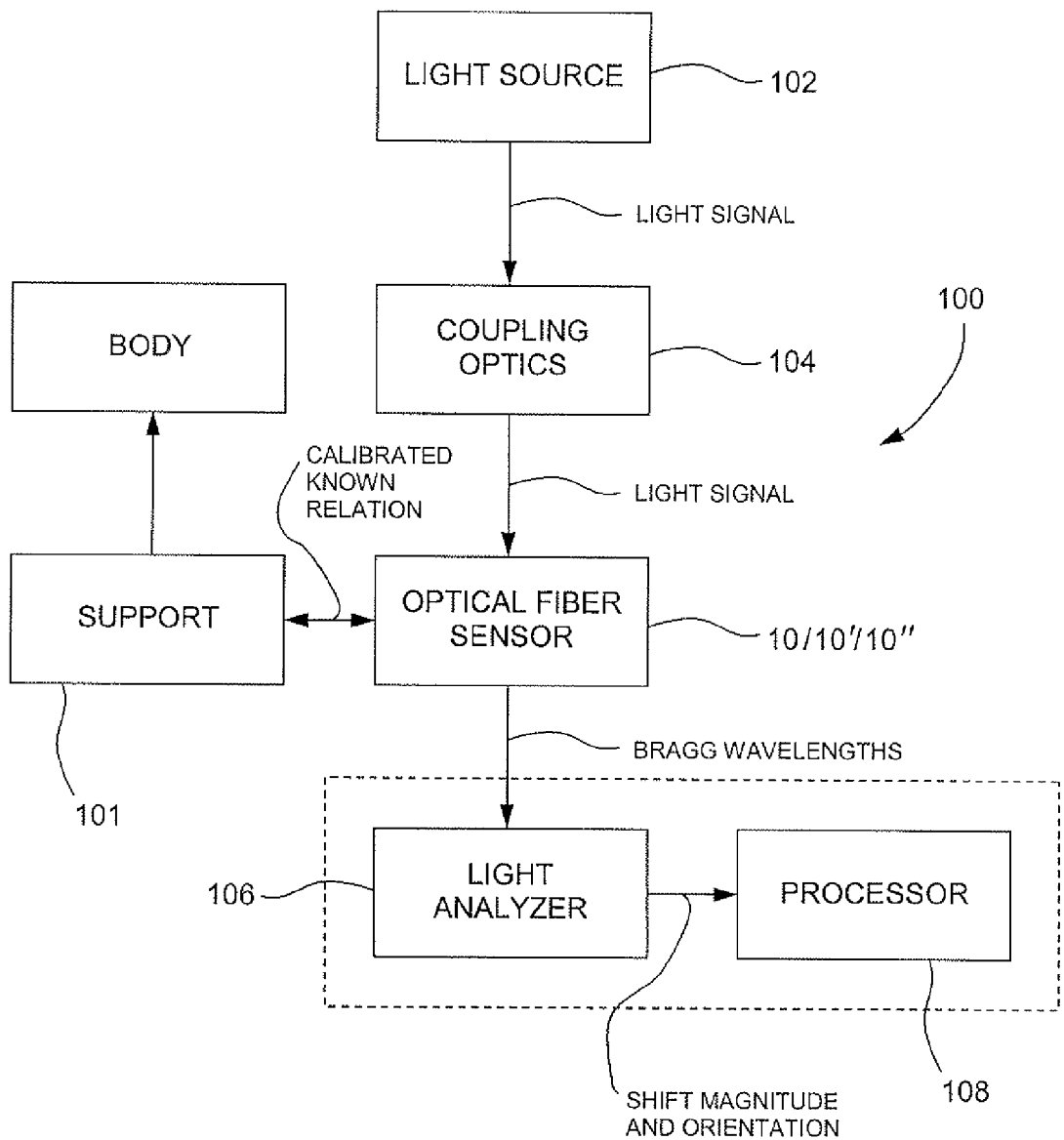
FIG. 6 is a schematic view of an optical fiber sensor system having one of the optical fiber sensors of FIG. 1 and FIG. 4.

Referring to FIG. 6, an optical fiber sensor system in accordance with the first and second embodiments is generally shown at 100. The optical fiber sensor system 100 has one of the optical fiber sensor 10/10'/10" (with optical fiber sensor 10" being described hereinafter for FIG. 7) secured to a support 101 in a predetermined way (i.e., known position and orientation), in which the optical fiber sensor 10/10'/10" is oriented for curvature measurement about two reference axes (FIGS. 1 and 2).

A light source 102 is provided with coupling optics 104 so as to multiplex light signals into the optical fiber sensor 10/10'/10". Therefore, light from the light source 102 is coupled to the central core 12, and the peripheral cores 13, 13', 14 and/or 14'. As the optical fiber sensor 10/10'/10" is mounted to a body by way of the support 101, movements in the body will cause strain in the Bragg gratings of the peripheral cores 13, 13', 14 and/or 14'. Accordingly, Bragg wavelength shifts can be determined in order to qualify (compressive or tensile strain) and quantify (angular value) the curvature.

In order to couple the light source 102 to the optical fiber sensor 10/10'/10" via the coupling optics 104, a first approach known in the art provides a multicore-to-single-core fiber fan-out to feed each core of the multicore fiber independently.

In such an arrangement for the coupling optics 104, the diameters of four single-core single-mode fibers are reduced using hydrofluoric acid. The fibers are then arranged in a square shape to match the core spacing of the optical fiber sensor 10/10'/10". The fiber 10/10'/10" is then connected to the fan-out by an adhesive bonded splice.

In one embodiment of the coupling optics 104, the fan-out arrangement includes five fibers, with one in the middle surrounded by four other fibers arranged in square shape in order to match the core distribution of the configuration of FIG. 4 of the fiber 10/10'/10". An efficient coupling is assured by reducing the fibers' cladding until the fiber core distances are matched.

In a second approach, as indicated in the US Publication No. US 2004/0234218, a refractive plano-concave lens is used to couple and extract the light from free-space beams. The light beams from different cores of the multicore fiber are separated in different directions by the plano-concave lens. Of course, the same configuration can be used to couple separated light beams into the fiber 10/10'/10".

At the outlet end of the optical fiber sensor 10/10'/10", the optical fiber sensor 10/10'/10" is coupled to a light analyzer so as to receive the transmitted light signals in an embodiment in which transmitted light signals are analyzed. It is, of course, considered to analyze reflected light signals in an alternative embodiment. The light analyzer 106 is typically an optical spectrum analyzer measuring shifts in the Bragg wavelengths.

A processor 108 associated with the light analyzer 106 performs the calculation of curvatures along the two axes of reference (e.g., axes X and Y in FIG. 1), as a function of the shift magnitude in Bragg wavelengths as provided by the light analyzer 106. The Bragg wavelength readings obtained from the Bragg gratings of the central core 12 are used to factor out the effect of temperature on the optical fiber sensor 10/10'/10". Hence, the processor 108 provides curvature magnitude and orientation over time, for instance in the form of angular values with respect to reference axes such as axes X and Y.

According to a first configuration, the Bragg wavelengths of each Bragg grating are different. This simplifies the detection of the wavelengths for the subsequent analysis of the results by both the light analyzer 106 and the processor 108 as each transmitted (or reflected) wavelength is directly associated with a specific Bragg grating and location in a specific core. The variation of Bragg wavelength of the Bragg gratings of the central core 12 will be used to determine the effect of temperature on the optical fiber sensor 10/10'/10".

According to a second configuration, the Bragg wavelengths at each location (e.g., L1, L2, etc., of FIG. 2) of the optical fiber sensor 10 are the same for an uncurved optical fiber sensor 10 at that given location. The light analyzer 106 must receive the transmitted (or reflected) light signals from each core of the optical fiber sensor 10/10'/10" separately.

The Bragg gratings are then identified as a function of the wavelengths detected and the selected core.

The processor 108 will read the Bragg wavelengths provided by the optical analyzer 106, and will determine shifts of the Bragg wavelengths, whereby curvature is calculable with respect to the reference axes (i.e., axes X and Y of FIG. 1). The reading of the Bragg wavelengths and calculation of curvature by the processor 108 is optionally performed over time.

The support 101 is defined as a function of the type of body/structure upon which the optical fiber sensor 10/10'/10" will be installed for curvature measurement. For instance, in one contemplated use of the optical fiber system 100, the optical fiber sensor 10/10'/10" is used to calculate curvature on various parts of the human body (e.g., back, spine, or the like). Therefore, the support 101 is some clothing that will marry the shape of the body part, and keep the optical fiber sensor 10/10'/10" in the predetermined orientation. As examples of suitable clothing are undershirts, tights, gloves, arm and leg sleeves, and the like.

Accordingly, the flat surface 15 (or flat surfaces 15 and 15' as will be described hereinafter for FIG. 7) represent one configuration, among other connection configurations, by which the orientation of the optical fiber sensor 10/10'/10" can be maintained throughout the use of the optical fiber sensor system 100. The flat surface 15 is machined into a glass (or polymeric) preform which will be melted and drawn to get an optical fiber. Therefore this technique represents an efficient solution for a quick and precise axes orientation determination. Alternatively, connection holes, peripheral depressions or the like can be used to connect the optical fiber sensor 10/10'/10" to a body in a connection configuration.

In accordance with the contemplated use of the optical fiber sensor system 100, a calibration is typically performed at a constant temperature to obtain an initial position and orientation of the optical fiber sensor 10/10'/10" with the body whose curvature is to be detected. For instance, it is contemplated to perform a calibration of the initial value of Bragg wavelengths of each grating with respect to the body, such that a given curvature at a specific location of the optical fiber sensor 10/10'/10" is associated with a position on the body.

In the embodiments of FIGS. 1-2 and 4-5, the peripheral cores 13, 13', 14 and/or 14' are positioned to provide curvature about the axes X and Y. More specifically, strain sustained by the peripheral cores 13/13' will represent curvature about the Y-axis (normal to the plane of the body at the location of the set of gratings), whereas strain sustained by the peripheral cores 14/14' will represent curvature about the X-axis (parallel to the plane of the body at the location of the set of gratings). It is pointed out that other positions are contemplated for the peripheral cores 13, 13', 14 and 14', within the cladding 11, and with respect to the connection configuration (i.e., the flat surface 15).

Moreover, the distances A and B between the central core 12 and the peripheral cores 13 and 14 (FIG. 1) can be adjusted at the design time, as a function of the required sensitivity and the flexibility of the optical fiber sensor 10/10'/10". Greater distances A and B (and thus greater diameter of the fiber 10/10'/10") will result in increased sensitivity of the sensor and decreases flexibility of the fiber, and vice-versa.

Although the optical fiber sensor 10/10'/10" is illustrated as being generally circular, it is pointed out that the other cross-section shapes (square, rectangular, trapezoidal, etc . . . ) are considered for the optical fiber sensors 10/10'/10". Moreover, curvature detection can be performed about a single axis, such as axis X (FIG. 1). In such a case, only one peripheral core is necessary, such as peripheral core 14 for curvature measurement about the X-axis.

Figure 7:
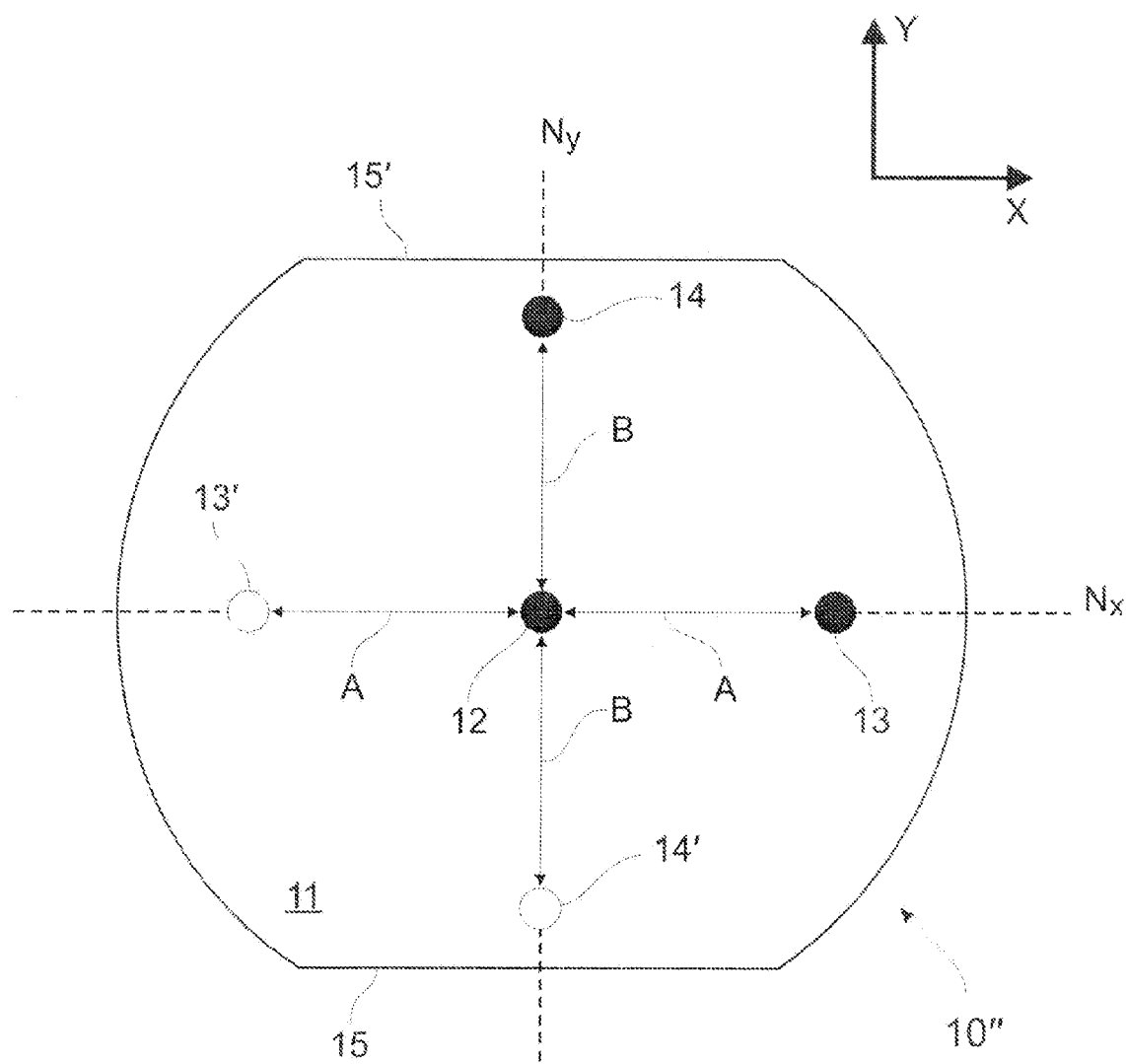
FIG. 7 is an end elevation view of an optical fiber sensor in accordance with a third embodiment of the present invention.

Referring to FIG. 7, an optical fiber sensor in accordance with a third embodiment is generally shown at 10" The optical fiber sensor 10" is similar to the optical fiber sensor 10' of FIG. 4, whereby like reference numerals will designate like elements.

The cladding 11 of the optical fiber sensor 10" has a generally circular section, but with a pair of flat edges, defining flat surfaces 15 and 15' on the full length of the cladding 11. Advantageously, the fiber sensor 10" is symmetrical along both the X- and Y-axes. The planes of symmetry are therefore coplanar with the first neutral plane $N_x$ and the second neutral plane $N_y$. The presence of a pair of flat surfaces 15 and 15' facilitates the securing of the optical fiber sensor 10" in a desired orientation, and ensures that the central core 12 is n the neutral planes for both axes.

Amongst contemplated uses for the optical fiber sensors 10/10'/10" and the optical fiber sensor system 100 are posture detection (e.g., health clubs) and posture correction, ergonomic studies, physical rehabilitation. Other uses are virtual-reality movement detection, computer animation (e.g., reproduction of body movements), air-bag deployment control, movement-detecting prosthesis, auto-adjusting seating devices. Other uses are contemplated, whereby the list of above-described uses is non-exclusive.

The invention claimed is:

1. An optical fiber sensor for detecting curvature of a body/structure, comprising:
   a cladding having an outer periphery;
   a central core for receiving and transmitting light, the central core having Bragg gratings and being positioned in a first neutral plane of the cladding, such that the Bragg gratings of the central core are generally insensitive to bending about a first axis associated with the first neutral plane and sensitive to temperature variations;
   at least one peripheral core for receiving and transmitting light, the at least one peripheral core having Bragg gratings and being peripherally positioned in the cladding with respect to the first neutral plane such that the Bragg gratings of the at least one peripheral core are sensitive to bending about the first axis and to temperature variations; and
   a connection configuration in the outer periphery of the cladding to attach the optical fiber sensor to a body/structure such that the central core and the at least one peripheral core are in a predetermined position and orientation with respect to the body/structure, so as to measure curvature of the body/structure about at least the first axis independently of the effect of temperature variations by associating the Bragg wavelengths of the central core and of the at least one peripheral core.

2. The optical fiber sensor according to claim 1, wherein the cladding has a generally circular cross-section.

3. The optical fiber sensor according to claim 2, wherein the connector configuration has two diametrically opposed flat surfaces defined along the cladding in the outer periphery, with the first neutral plane being coplanar with a plane of symmetry of the optical fiber sensor, the plane of symmetry being parallel to the two diametrically opposed flat surfaces.

4. The optical fiber sensor according to claim 1, wherein the Bragg gratings in the central core and the at least one peripheral core are longitudinally aligned in sets along the optical fiber sensor.

5. The optical fiber sensor according to claim 4, wherein the Bragg gratings in each of the sets have a different Bragg wavelength, with each Bragg wavelength being associated with a position along the optical fiber sensor.

6. The optical fiber sensor according to claim 1, comprising two of the peripheral cores, with Bragg gratings in the central core and the two peripheral cores being longitudinally aligned in sets along the optical fiber sensor.

7. The optical fiber sensor according to claim 1, comprising two of the peripheral cores and wherein a first of the two peripheral cores and the central core lie in the first neutral plane, a second of the two peripheral cores and the central core lie in a second neutral plane associated with a second axis, with the first neutral plane and the second neutral plane being perpendicular to one another, such that only the first peripheral core is sensitive to bending about the second axis, and only the second peripheral core is sensitive to bending about the first axis.

8. The optical fiber sensor according to claim 7, wherein the connector configuration has two diametrically opposed flat surfaces defined along the cladding in the outer periphery.

9. The optical fiber sensor according to claim 8, wherein the flat surfaces are parallel to the first neutral plane and perpendicular to the second neutral plane.

10. The optical fiber sensor according to claim 1, comprising four of the peripheral cores, with Bragg gratings in the central core and the four peripheral cores being longitudinally aligned in sets along the optical fiber sensor.

11. The optical fiber sensor according to claim 10, wherein a first pair of the four peripheral cores and the central core lie in the first neutral plane, a second pair of the four peripheral cores and the central core lie in a second neutral plane associated with a second axis, with the first plane and the second plane being perpendicular to one another, such that only the first pair is sensitive to bending about the second axis, and only the second pair is sensitive to bending about the first axis.

12. A method for measuring curvature in a body, comprising the steps of:
   providing an optical fiber sensor having at least two cores in a cladding with a first one of the at least two cores being positioned in a neutral plane with respect to a first axis of curvature of the optical fiber sensor and a second one of the at least two cores being positioned away from the neutral plane, a plurality of longitudinal sets of Bragg gratings being provided in the cores at known locations along the optical fiber sensor, each Bragg grating having a different Bragg wavelength;
   positioning the optical fiber sensor on a body in a known position and orientation;
   emitting light in the optical fiber sensor;
   receiving light from the optical fiber sensor;
   measuring the Bragg wavelengths from the light received from the optical fiber sensor; and
   calculating the curvature of the body without temperature-induced Bragg wavelength variations by associating the measured Bragg wavelengths of the at least two cores to the known locations, and by decoupling the measured Bragg wavelengths of the first and the second one of the at least two cores.

* * * * *